US012443711B1

(12) United States Patent
     Slapp

(10) Patent No.: US 12,443,711 B1
(45) Date of Patent: Oct. 14, 2025

(54) DATA BACKUP AND RECOVERY SYSTEM

(71) Applicant: SteelDome Cyber, LLC, New York, NY (US)

(72) Inventor: Jeffrey Slapp, Delray Beach, FL (US)

(73) Assignee: SteelDome Cyber, LLC, NY (US)

( * ) Notice: Subject to any disclaimer, the term of this patent is extended or adjusted under 35 U.S.C. 154(b) by 189 days.

(21) Appl. No.: 17/994,949

(22) Filed: Nov. 28, 2022

Related U.S. Application Data

(60) Provisional application No. 63/283,813, filed on Nov. 29, 2021.

(51) Int. Cl.
    *G06F 21/56* (2013.01)

(52) U.S. Cl.
    CPC .................................. *G06F 21/565* (2013.01)

(58) Field of Classification Search
    None
    See application file for complete search history.

(56) References Cited

U.S. PATENT DOCUMENTS

| | | | | |
|---|---|---|---|---|
| 11,784,976 B1 * | 10/2023 | Wei | ........................ | H04L 63/08 726/1 |
| 2012/0185413 A1 * | 7/2012 | Felter | ................ | G06Q 30/0645 711/E12.001 |
| 2014/0215590 A1 * | 7/2014 | Brand | ................... | G06F 9/5072 726/6 |
| 2017/0083379 A1 * | 3/2017 | Nachtrab | ............... | G06F 9/5072 |
| 2018/0136858 A1 * | 5/2018 | Figueroa | ................. | G06F 3/065 |
| 2019/0089677 A1 * | 3/2019 | Ashley | ................ | H04L 63/0263 |
| 2020/0042707 A1 * | 2/2020 | Kucherov | ............. | G06F 3/0683 |
| 2020/0201827 A1 * | 6/2020 | Chacko | ................. | G06F 9/4451 |

* cited by examiner

*Primary Examiner* — Philip J Chea
*Assistant Examiner* — Bin Qing Zheng
(74) *Attorney, Agent, or Firm* — Nutter, McClennen & Fish, LLP

(57) ABSTRACT

Automatically provisioning a data backup and recovery system by a storage vault controller involves receiving specification of a number of end points to use for storing user data in one or more cloud-based storage systems, receiving a distinct name for each of the end points, receiving cloud storage credentials for a plurality of pre-configured cloud storage buckets, receiving a mapping of the end points to the pre-configured cloud storage buckets, mounting the end point names, automatically associating each end point with a corresponding pre-configured cloud storage bucket and cloud storage credentials in accordance with the mapping wherein user data written to a mounted end point name is automatically written securely to the corresponding cloud storage bucket, and generating a plurality of successive immutable incremental snapshots of the data in the cloud storage buckets.

21 Claims, 8 Drawing Sheets

```
            *** SteelDome InfiniVault Administration Console v1.2.0-RELEASE ***

LICENSE INFO:        Type:              Enterprise Vault License (1 PB+)
                     Key:               Mfd1dfed-51de-Me92-a20a-d8ff3822f2b0
                     Registered To:     SteelDome Cyber, Inc.
                     Expires:           N/A IP ADDRESSES:        192.168.59.128/24
MEM TOTAL (KB):      32,860,048
MEM FREE (KB):       5,267,740
POOLS ONLINE:        1 (DEGRADED: 0)
ALLOCATED CAPACITY:  400GiBs                     SMB ENABLED:      YES
SNAPSHOTS AVAILABLE: 148                         NFS ENABLED:      YES
SNAPSHOTS MOUNTED:   0                           iSCSI ENABLED:    NO
MAINTENANCE MODE:    DISABLED                    OBJECT ENGINES:   0

-------- SETUP FUNCTIONS --------           --- ADMINISTRATIVE FUNCTIONS ---
1)  Cloud Storage Credentials               a) Display Stats Dashboard
2)  Set Data Encryption Password            b) List Pools
3)  Storage Wizard                          c) Scrub Pools
4)  File Shares                             d) Repair Pools
5)  iSCSI Settings                          e) Delete Pools
6)  Network Settings                        f) List Snapshots
7)  Network Settings (advanced)             g) Create Snapshots
8)  Snapshot Scheduling                     h) Delete Snapshots
9)  Boot Mount Options                      i) Mount Snapshots
10) Set Vault Hostname                      j) Unmount Snapshots
11) Set Vault Time                          k) List All Mounts
12) Firewall Settings                       l) Manually Mount Pools
13) Join Active Directory Domain
14) Configure Object Storage
20) Enter License Key ------ AUXILIARY FUNCTIONS ------
30) Backup Config
31) Recover from Previous Config
40) Generate Support Logs
50) Generate MD5 Checksum Report
60) Maintenance Mode
99) Logout                                  z) Reboot Vault Enter an option:
```

FIG. 4

WELCOME TO THE SETUP WIZARD

Welcome to the InfiniVault Data Protection Vault Setup Wizard. This wizard will assist you with configuring the vault for proper use with the Microsoft Azure, Amazon S3 or Wasabi S3 public cloud storage platforms. Please ensure that you have completed the following pre-installation steps before proceeding:

** configured the cloud provider(s) storage
** configured the cloud provider(s) credential file
** provide the encryption passphrase (if enabled)

If these items have not been completed, quit this wizard and complete before proceeding.

< OK >

FIG. 5

DATA BACKUP AND RECOVERY SYSTEM

CROSS-REFERENCE TO RELATED APPLICATION(S)

This patent application claims the benefit of United States Provisional Patent Application No. 63/283,813 entitled DATA BACKUP AND RECOVERY SYSTEM filed Nov. 29, 2021, which is hereby incorporate herein by reference in its entirety.

STATEMENT REGARDING FEDERALLY SPONSORED RESEARCH

N/A.

STATEMENT REGARDING PRIOR DISCLOSURES BY THE INVENTOR OR A JOINT INVENTOR UNDER 37 C.F.R. 1.77(b)(6)

N/A.

FIELD OF THE INVENTION

The invention generally relates to data backup and recovery.

BACKGROUND OF THE INVENTION

As has been widely reported, the incidence of so-called ransomware attacks, and particularly ransomware attacks in which a victim's data is encrypted or otherwise destroyed or locked in order to prevent access to the data, is increasing at an alarming rate, in large part because such attacks are effective and payment to the attacker can be made with untraceable currencies such as cryptocurrencies. In some cases, an attacker is not looking for money but instead is just trying to damage an entity such as a company or government. Of course, data loss and corruption can occur in other ways including from failures and accidental deletions.

SUMMARY OF VARIOUS EMBODIMENTS

In accordance with certain embodiments of the invention, automatically provisioning a data backup and recovery system by a storage vault controller involves receiving specification of a number of end points to use for storing user data in one or more cloud-based storage systems, receiving a distinct name for each of the end points, receiving cloud storage credentials for a plurality of pre-configured cloud storage buckets, receiving a mapping of the end points to the pre-configured cloud storage buckets, mounting the end point names, automatically associating each end point with a corresponding pre-configured cloud storage bucket and cloud storage credentials in accordance with the mapping wherein user data written to a mounted end point name is automatically written securely to the corresponding cloud storage bucket, and generating a plurality of successive immutable incremental snapshots of the data in the cloud storage buckets.

In various alternative embodiments, the user data may be stored redundantly across the end point in accordance with a user-specified type of redundancy. The storage vault controller may be deployed in a private user network, in which case the storage vault controller may be configured to only accept user data from one or more trusted endpoints internal to the private user network and further may be configured to communicate securely with the one or more cloud-based storage systems via a user private core routing firewall through an interface that will not accept any externally sourced connections other than authorized secure vault administrator connections. Alternatively, the storage vault controller may be deployed in a public network, in which case the storage vault controller may be configured to receive user data from a user private network over a secure data flow and further may be configured to communicate securely with the one or more cloud-based storage systems through an interface that will not accept any externally sourced connections other than authorized secure vault administrator connections. The successive immutable incremental snapshots may be statistically analyzed and an alert may be generated based on an abnormal pattern of snapshot sizes suggestive of a possible ransomware attack (e.g., a large amount of incompressible data).

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4 shows a vault administration console main menu screen, in accordance with one exemplary embodiment.

FIG. 5 shows a Storage Wizard main menu screen, in accordance with one exemplary embodiment.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Embodiments include a data backup and recovery appliance (which is referred to herein as a "the storage vault controller" and may be referred to herein as "Infini Vault") that manages the transmission, storage, and recovery of immutable, read-only copies of a user's data in a secure manner using cloud-based storage services (referred to herein for convenience as the "storage vault"). The term "user" is used here broadly to refer to an entity that is implementing and/or using storage backup and recovery services of the types described herein. For example, and without limitation, a user can be an individual, a company, an organization, an agency, or other entity. In various exemplary embodiments described below, the user is a customer of a third-party vault administrator that provides and operates the storage vault controller, although it should be noted that the user and vault administrator can be the same entity. Thus, the terms "user" and "customer" generally can be used interchangeably in the exemplary embodiments described below. For convenience, the vault administrator is referred to as SteelDome (i.e., the Applicant/owner of this patent application) in the exemplary embodiments described below, although it should be noted that the invention is not limited by or to any particular vault administrator. Without limitation, the storage vault controller can be a physical or virtual appliance (e.g., it can be a virtual machine running on a public cloud-based server or a private user server, or can run on dedicated hardware as an appliance). It should be noted that embodiments can be used for general data backup and recovery but are contemplated as being particularly useful for addressing ransomware attacks and other types of data breaches, data losses (e.g., deleted files), data corruption, and data outages (e.g., continuity could be provided through the appliance if needed).

Figure 1:
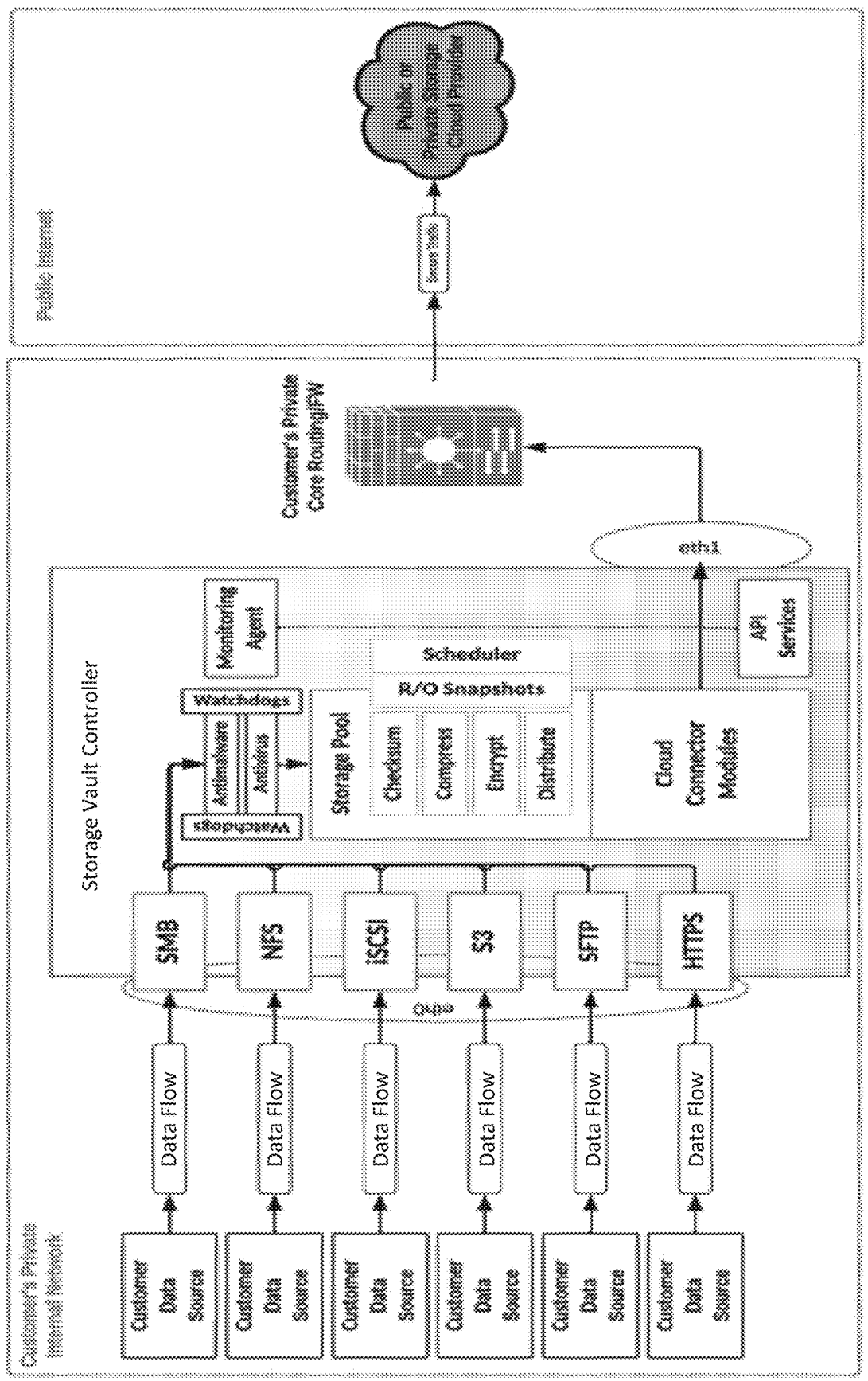
FIG. 1 is a schematic block diagram of a storage backup and recovery system configured for private cloud deployment, in accordance with certain exemplary embodiments.

FIG. 1 is a schematic block diagram of a storage backup and recovery system configured for private cloud deployment, in accordance with certain exemplary embodiments. In this example, the storage vault controller operates within the private user network.

The storage vault controller is in communication with any of various user/customer data sources (e.g., application server, database server, file server, backup server, etc.). The user/customer data sources may interface with the storage vault controller via an Ethernet port (identified as "eth0") and/or other local interface and can utilize any of a variety of data storage media (e.g., disk, solid state, etc.), storage formats (e.g., block, object, file, etc.), and interface protocols (e.g., SMB/CIFS, NFS, ISCSI, S3, SCP/SFTP, HTTPS, etc.). Communications between the user data sources and the storage vault controller are generally only permitted from trusted endpoints internal to the private user network such as via IPSec or authenticated communication sessions, which, among other things, this reduces the chances of unauthorized access to the storage vault controller via this interface.

The storage vault controller is also in communication with one or more public or private storage providers (e.g., cloud storage providers such as Microsoft Azure, Amazon S3, Wasabi S3, etc.) via the user's private core routing firewall for securely storing user data in one or more storage vaults maintained in the public or private storage providers. The storage vault controller may interface with the user's private core routing firewall via an Ethernet port (identified as "eth1") and/or other appropriate interface. Communications between the storage vault controller and the storage providers are generally secure (e.g., SSL or AES encrypted communications). Preferably, the interface through which the storage vault controller interfaces with the user's private core routing firewall (e.g., "eth1") will not accept any externally sourced connections other than authorized secure vault administrator connections.

Figure 2:
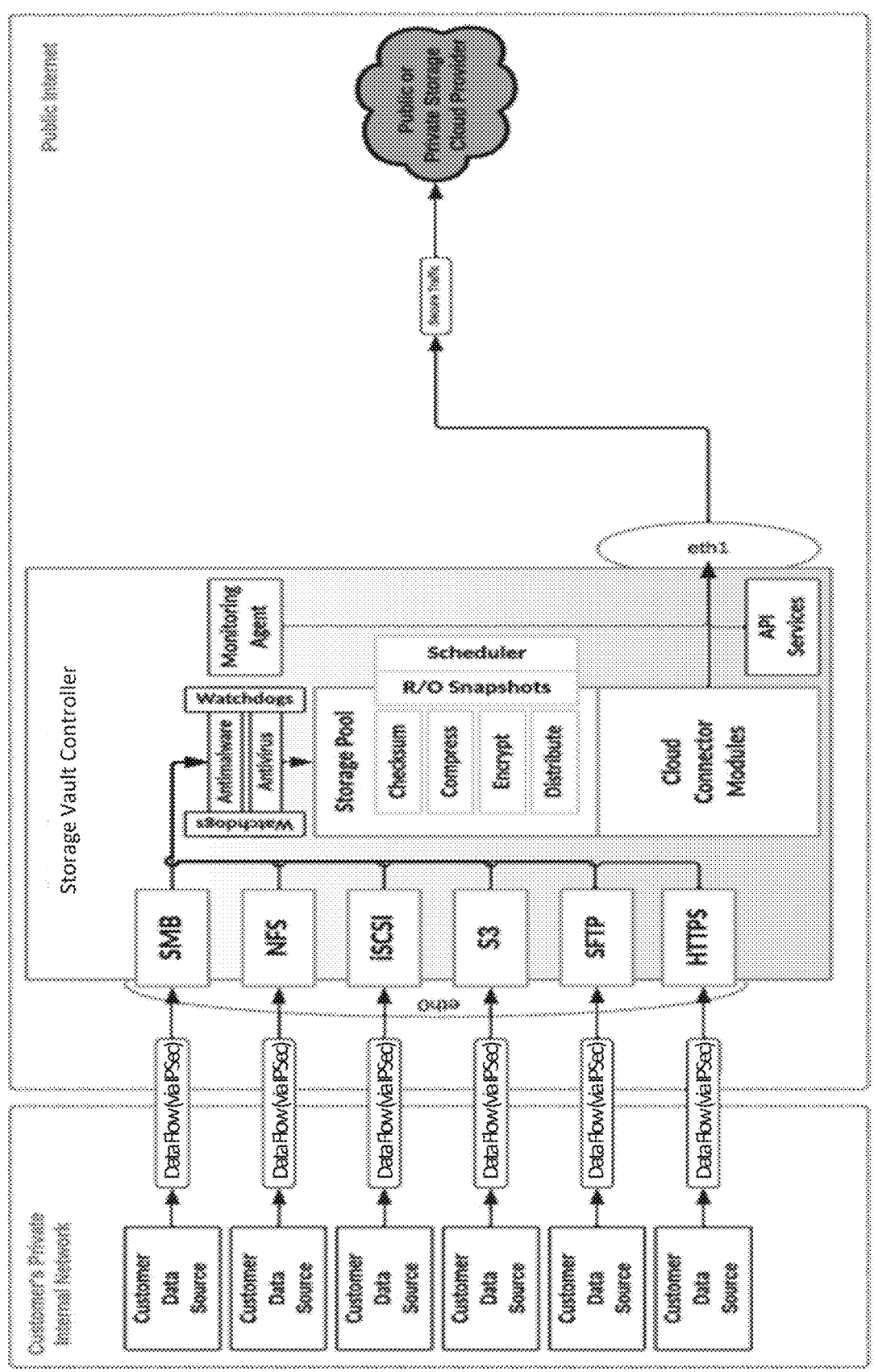
FIG. 2 is a schematic block diagram of a storage backup and recovery system configured for public cloud deployment, in accordance with certain exemplary embodiments.

FIG. 2 is a schematic block diagram of a storage backup and recovery system configured for public cloud deployment, in accordance with certain exemplary embodiments. In this example, the storage vault controller operates outside of the private user network (e.g., in a cloud-based service or other system accessible over the public Internet or in a vault administrator private virtual network that is isolated from the private user network). As in FIG. 1, the storage vault controller is in communication with any of various user/customer data sources (e.g., application server, database server, file server, backup server, etc.). The user/customer data sources may interface with the storage vault controller via an Ethernet port (identified as "eth0") and/or other local interface and can utilize any of a variety of data storage media (e.g., disk, solid state, etc.), storage formats (e.g., block, object, file, etc.), and interface protocols (e.g., SMB/CIFS, NFS, iSCSI, S3, SCP/SFTP, HTTPS, etc.). Communications between the user/customer data sources in the private user network and the storage vault controller operating external to the private user network are generally conducted over secure data flows (e.g., via IPSec or authenticated data flows).

The storage vault controller is also in communication with one or more public or private storage providers (e.g., cloud storage providers such as Microsoft Azure, Amazon S3, Wasabi S3, etc.). The storage vault controller may interface with the storage providers via an Ethernet port (identified as "eth1") and/or other appropriate interface. Communications between the storage vault controller and the storage providers are generally secure (e.g., SSL or AES encrypted communications). Preferably, the interface through which the storage vault controller interfaces with the user's private core routing firewall (e.g., "eth1") will not accept any externally sourced connections other than authorized secure vault administrator connections.

In certain exemplary embodiments, the storage vault controller is a "thin" appliance that runs on the Ubuntu Linux type operating system, which, for security purposes, is installed using an encrypted software installation method and uses only in-memory caching of critical operational data. Preferably, only the bare minimum of operating system and application software components are loaded to reduce the chances that an ancillary software component can be used to gain access to the storage vault. In certain embodiments, during installation of the storage vault controller, a public key (e.g., randomized RSA-2048 key) is generated and stored for later use in accessing storage vault controller resources. Also, once the operating system is running securely, scripts are run to complete configuration including turning off all root accounts and privileged accounts, creating new privileged accounts with new names, assigning public keys and private keys for those accounts, and storing a 64-character password that is only shown one time after which a provisioning engineer inserts the password into secure user database for future use to log into the vault.

In this example, the storage vault controller includes a monitoring agent, e.g., a Remote Monitoring and Management (RMM) agent, for remote monitoring and management of the storage vault controller. Preferably, the monitoring agent communicates with a remote monitoring provider (e.g., an RMM provider accessible over the public Internet) via a secure connection using a designated storage vault controller interface (e.g., the Ethernet port identified as "eth1" in the figures) that will not accept any externally sourced connections other than authorized secure vault administrator connections (e.g., in certain embodiments, the monitoring agent will only accept an SSH connection from an IP range associated with the vault administrator).

As described in greater detail below, the storage vault controller preferably includes various "watchdog" processors such as, for example, antimalware and antivirus processors that are used to pre-process data from the user/customer data sources. Also as described in greater detail below, the storage vault controller also includes various storage pool processors that prepare user/customer data for storage and cloud connectors that facilitate communication with the storage providers.

Figure 3:
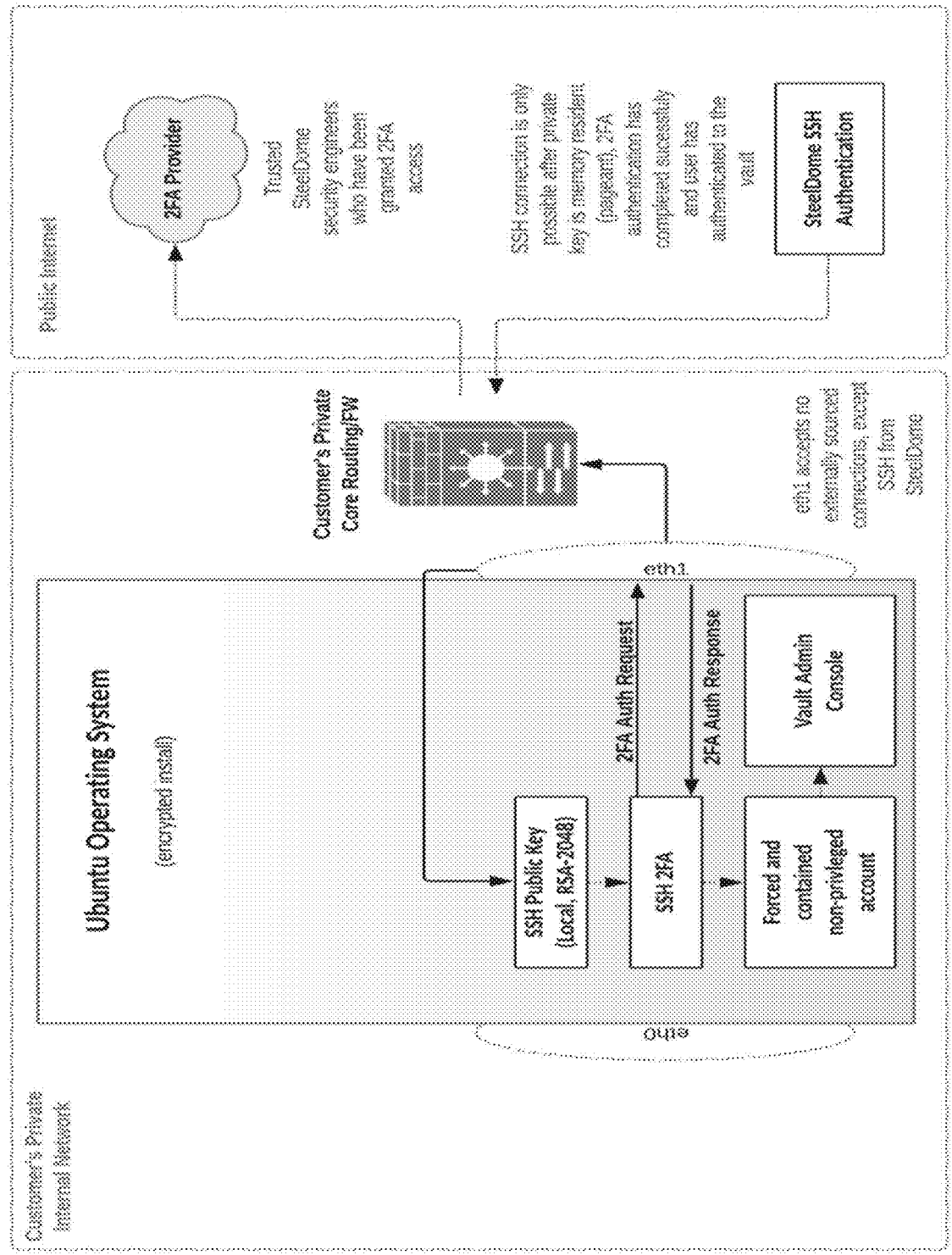
FIG. 3 is a schematic diagram showing a security map for accessing a vault administration console, in accordance with one exemplary embodiment.

In certain exemplary embodiments, the storage vault controller provides a vault administration console that can be used to create and manage storage vaults and a database administration console that can be used to manage a secure "local" database (which may be physically stored in the storage vault controller or may be securely stored remotely from the storage vault controller) maintained by the vault administrator for storing operational information such as provisioning information, public and private encryption keys, and other operational data for each storage vault. FIG. 3 is a schematic diagram showing a security map for accessing the vault administration console, in accordance with one exemplary embodiment. It should be noted that the security map for accessing the database administration console is essentially the same as in FIG. 3 and therefore is not shown separately. Preferably, these consoles are only accessible from a forced and contained non-privileged account reached through a local host connection. This account provides access to a limited set of functions controlled by the storage vault controller. The person attempting to access a console must authenticate themselves to the storage vault controller as being an authorized/trusted user associated with the storage vault controller operator (which, in this example, is shown as being SteelDome, the applicant for this patent application). Among other things, this involves establishing an SSH connection for remote access through the monitoring (RMM) agent, which is only possible after the SSH private key is memory resident (e.g., using Pageant), two-factor authentication has completed successfully, and the user has authenticated to the system (e.g., via username and password). Among other things, the two-factor authentication addresses the issue of a former authorized user or an unauthorized user who may have retained or gained access to certain authentication credentials, where the two-factor authentication will only succeed if the user has physical possession and access to the mobile device used for two-factor authentication. In addition to the "local" database in the storage vault controller, the vault administrator also maintains a secure remote database for storing system-level operational parameters, e.g., operational parameters for accessing and managing the storage vault controller(s) being managed by the vault administrator. These databases are preferably installed and stored in an encrypted form and in a manner where unlikely compromise of the operating system (e.g., capturing of an image of the operating system files) will not reveal database encryption keys. While FIG. 3 depicts the security map for a private cloud deployment as in FIG. 1, it should be noted that the security map for a public cloud deployment as in FIG. 2 would be essentially the same.

FIG. 4 shows a vault administration console main menu screen, in accordance with one exemplary embodiment. Among other things, an authorized administrator can provision, manage, and troubleshoot from this menu. For example, the administrator can enter cloud storage credentials (menu option 1), set a data encryption password (menu option 2), access a storage "wizard" (menu option 3) to set up and manage one or more storage pools. The storage "wizard" is essentially a script used to provide information that allows the storage vault controller to quickly and automatically establish a storage vault containing one or more storage pools.

FIG. 5 shows a Storage Wizard main menu screen, in accordance with one exemplary embodiment. In this exemplary embodiment, the cloud storage resources, cloud provider credentials, and an encrypted passphrase (if used) must be in place before the user can establish the storage pool(s). It should be noted that storage resources provisioned in the cloud storage systems are generally configured to only accept connections from user firewall, thereby reducing the chance that an intruder can gain access to the user data in the cloud-based storage systems.

Figure 6:
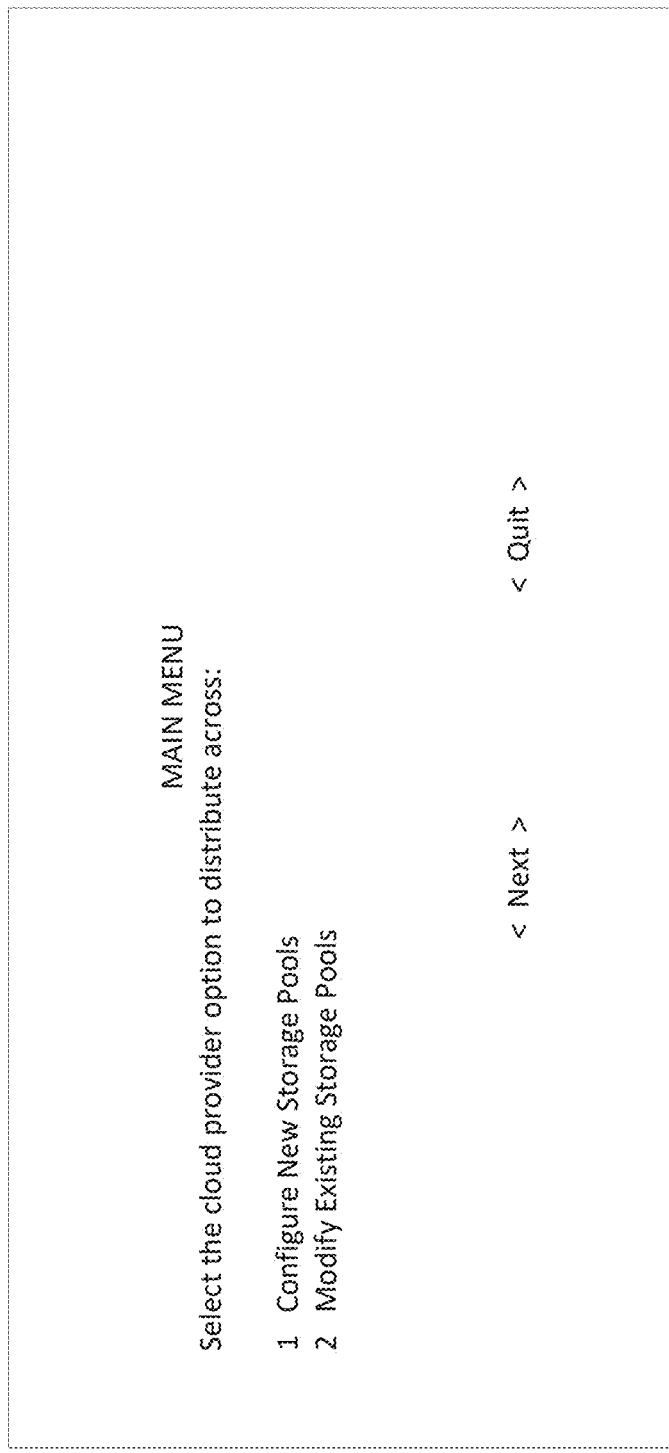
FIG. 6 shows a storage pool menu screen, in accordance with one exemplary embodiment.
Figure 7:
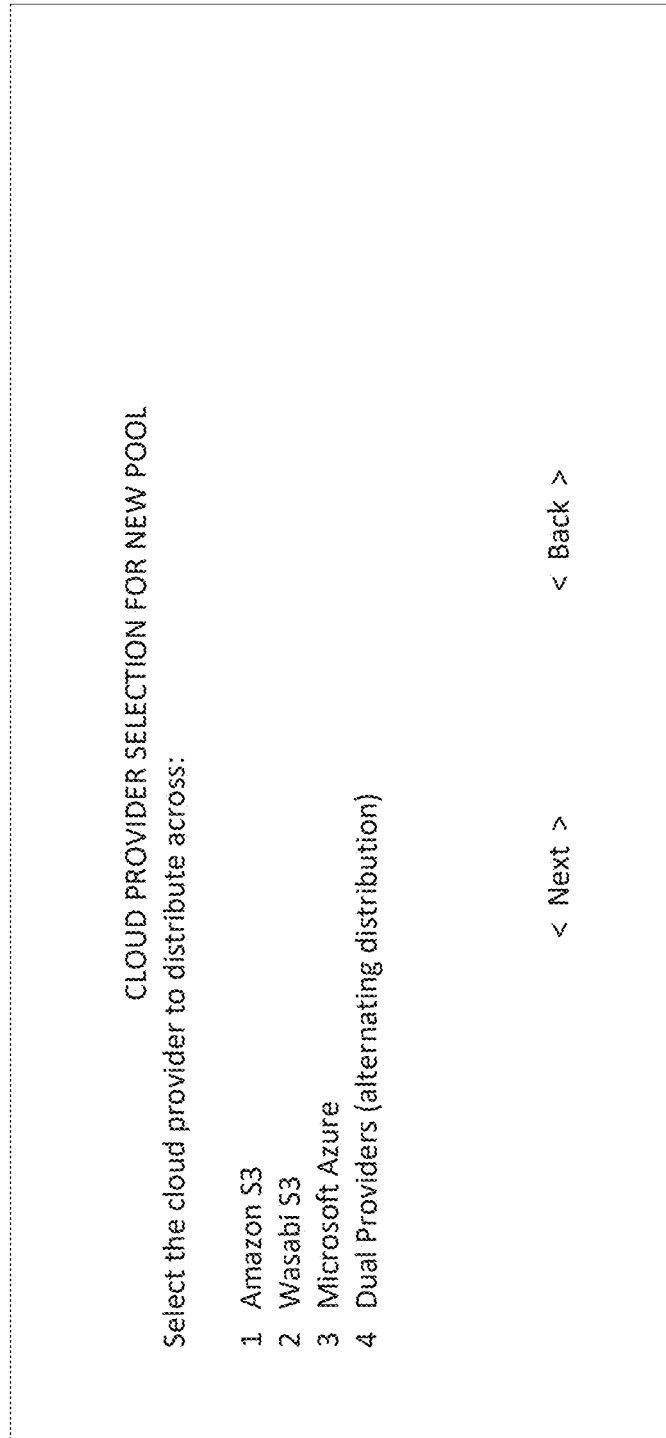
FIG. 7 shows a cloud storage selection menu screen, in accordance with one exemplary embodiment.

After these resources have already been established, the administrator can proceed to configure new storage pools or modify existing storage pools through the menu shown in FIG. 6. When creating a new storage pool, the administrator first selects the cloud storage provider(s) across which the data is to be stored from the menu shown in FIG. 7. In this example embodiment, cloud storage from Amazon, Wasabi, and Microsoft are supported, although it should be noted that other cloud storage providers additionally or alternatively may be supported. Also, since cloud storage services generally use standard protocols, embodiments can utilize multiple different cloud storage services and can easily incorporate new cloud storage services as they become available. When multiple cloud storage services are being used simultaneously, then in this example embodiment the administrator configures which cloud service to distribute first, which cloud service to distribute second, etc.

After the cloud storage provider(s) have been configured for the new storage pool, the storage resources and operational parameters are configured through additional menu screens. Among other things, the user specifies the number of distribution points (which may be referred to herein as "buckets") to be included in the storage pool across which data will be stored. In this exemplary embodiment, the user can select from even numbers of storage buckets (i.e., 2, 4, 6, 8, 10, 12, 14, or 16 in this example embodiment), although additional and/or alternate selections can be provided in other embodiments. The user then selects how data storage is to be distributed across the storage buckets. In this exemplary embodiment, data is always stored using a redundant storage scheme, which, depending on the number of storage buckets, can include RAID-1 (mirroring), RAID-5 (striping with single parity), RAID-6 (striping with dual parity), or RAID-7 (striping with triple parity), RAID-10 (mirroring+striping), although additional and/or alternate redundant storage schemes can be used in other embodiments. Thus, for example, if RAID-5 is used with six buckets, then five buckets would be used to store user data and the sixth bucket would be used to store parity data computed from the five user data buckets. If each of these buckets is 100 GB (where the bucket size is configured by the user), then the total amount of storage for the storage pool would be 600 GB, of which 500 GB could be used for storing user data. The administrator then configures local mount points for each of the buckets (i.e., locally-unique descriptive names for the buckets that will be used as the mount points where the buckets will be connected to the operating system. The administrator then enters cloud storage system information for each bucket (e.g., account name and file share name for Azure storage, a name and region for S3 storage)—this information needs to match corresponding information in the cloud storage systems. The administrator then enters a name for the pool as well as a per-bucket storage capacity, and configures whether or not data-at-rest encryption is to be added by the storage vault controller to encrypt the data before sending it to the cloud storage systems. Once this information has been entered and confirmed by the administrator, the system automatically completes the provisioning and configuration of resources for the vault, in which case the storage vault controller is ready to receive and process user data.

As user data is provided to the storage vault controller, the data is preferably processed by one or more "watchdog" processors. For example, an anti-malware processor may be included to detect malware in the user data, an anti-virus processor may be included to detect computer viruses in the user data, and/or an anti-ransomware processor (not shown) may be included to detect suspected incidents of ransomware at this data intake stage, for example, based on unusual patterns of user data (e.g., an unusually large bolus of data or detection of a large amount of already-encrypted data when user data is generally not encrypted). If the storage vault controller detects problems with the user data, then the storage vault controller can generate an alert (e.g., to the user and/or the vault administrator) and/or can cleanse the data (e.g., remove or inactivate any malware or virus) and/or can block the data from being written to the storage vault. Therefore, in certain exemplary embodiments, the "watchdog" processors can be considered as a set of data pre-processors or filters to provide an added level of security for the user. It should be noted that such processors may be omitted from some embodiments and therefore such (pre-)processors may be considered optional.

User data that is ready for storage in the vault (e.g., user data that makes it through any "watchdog" processors) is then prepared for storage. In this example embodiment, the storage vault controller first validates the data, e.g., using a checksum or other mechanism to detect and in some cases correct data errors. The storage vault controller then compresses the data using any of a variety of data compression algorithms. Among other things, data compression can reduce the amount of storage space occupied by the user data in the storage vault, although it should be noted that already-encrypted data is generally incompressible and with some data compression algorithms can even increase in size and thus certain exemplary embodiments can infer a possible ransomware attack based on a large amount of incompressible data. In certain exemplary embodiments, the compressed data then optionally may be encrypted using unique encryption keys associated with the vault (e.g., based on the encryption configuration mentioned above). The data is then distributed to the appropriate cloud storage system(s) that form a storage pool for the storage vault via appropriate cloud connector(s) that depend on the types of cloud storage services being used (e.g., Secure SMBv3, Secure S3, etc.). The data is distributed in accordance with the configured redundancy. For example, if the storage vault uses data mirroring across two buckets, then the storage vault controller may send a copy of the data to each of the two buckets such that data can be recovered even if one of the cloud storage systems fails or becomes unavailable, but if the storage vault uses RAID-5 across six cloud storage systems, then the storage vault controller may generate six data images (five containing user data and one parity image generated from the five user data images) and send each of the six data images to a different bucket such that the data can be recovered if any one of the buckets fails or becomes unavailable. Once the data reaches the cloud connectors, the data is ready to be transmitted to the designated cloud storage services through the user's firewall. It should be noted that the communications between the storage vault controller and the cloud storage systems is generally secure/encrypted, i.e., independently of whether the storage vault controller encrypted the data.

From time to time, the storage vault controller triggers snapshots to be taken of the data in the cloud storage system(s). This is depicted in FIG. 1 and FIG. 2 as read-only (R/O) snapshots managed by a snapshot scheduler. In certain exemplary embodiments, snapshots are incremental (e.g., if no data has changed since the last snapshot then the new snapshot essentially takes up no space, and if data has changed since the last snapshot then the new snapshot only captures the incremental changes). Also, in part because of this incremental snapshotting, snapshots are generally taken very frequently, e.g., a snapshot every 15 minutes, plus a separate snapshot every hour, plus a separate snapshot every day with daily snapshots maintained for 14 days, plus monthly snapshots, plus yearly snapshots, etc. In certain exemplary embodiments, the snapshot schedule may be configurable such as for more frequent or less frequent snapshots. Furthermore, in certain exemplary embodiments, the snapshots are taken using inherent snapshotting capabilities of the cloud storage systems themselves such that the storage vault controller need not implement a complex snapshotting function of its own. Generally speaking, snapshots are maintained using pointers rather than storing copies of snapshotted data, and therefore the snapshots generally take up little if any additional storage unless there have been many changes since the last snapshot. Importantly, the snapshots are immutable so that they can be relied upon for backup if needed.

Generally speaking, the amount of data that changes on a daily basis in a typical user network is expected to be small, e.g., perhaps 1%-2% per day, and the amount of incremental storage needed for each snapshot taken throughout a given day, especially at a high snapshot rate (e.g., every 15 minutes), is expected to be very small. Therefore, in certain exemplary embodiments, the storage vault controller can be configured to statistically analyze snapshots to detect abnormal increases in snapshot sizes or abnormal snapshot size patterns (e.g., a single snapshot anomaly, a number of consecutive anomalous snapshots, etc.) that may indicate a possible encryption-based ransomware attack or other data problem (e.g., an attacker deleting large swaths of data), as such events would be expected to create larger-than-usual snapshot sizes due to the amount of changes captured from one snapshot to another. As mentioned above, when a potential problem is detected or inferred, the storage vault controller could take actions such as generating an alert and/or stopping the processing of incoming user data.

For any of a variety of reasons (e.g., an actual or suspected ransomware attack, a data breach or interruption, an inadvertent data deletion, etc.), the user can contact the vault administrator, which can help the user take remedial action. For example, upon learning of the potential ransomware attack, the vault administrator may access the storage vault controller to stop the storage vault controller from storing any additional data in the cloud storage systems. Additionally or alternatively, the vault administrator may access the storage vault controller to restore user data from a given snapshot (e.g., a snapshot taken prior to the time of the ransomware attack) back to the primary storage system(s) and in some cases even may allow the user's systems to mount directly to a particular snapshot stored in the cloud storage systems, which, for example, could allow the user to resume business operations quickly while providing time for the user to diagnose and repair issues with the primary storage system(s).

In certain exemplary embodiments, before the vault administrator will take any remedial action, the vault administrator will authenticate the person requesting remedial action in order to confirm that the person is authorized by the user/customer. In this regard, the vault administrator will look up the person in a user record to find a mobile phone number for the person and will interact with the two-factor authentication system to send a two-factor authentication token to the mobile phone, which the person has to physically acknowledge using the mobile phone. Thus, the person must have access to the mobile phone in order to complete the two-factor authentication. Even passing the two-factor authentication, the vault administrator will take further steps to authenticate the person, e.g., asking personalized questions. Only then will the vault administrator take action on behalf of the person, e.g., restoring data from a snapshot or mounting a snapshot. Of course, it is conceivable that the person is an impostor who had access to the mobile phone and answers to the personalized questions (e.g., perhaps working in concert with the mobile phone owner, stealing the mobile phone from the owner, or other means). Thus, the system provides a further level of protection because nothing that the person does to the recovered or mounted data will change the immutable snapshots maintained by the system, and, as mentioned above, if the snapshot is mounted, then further snapshots are suspended, so the person literally could wipe the entire mounted snapshot (which is a read/write version of the snapshot) without changing the originally and still-maintained snapshot.

In order to restore data from a snapshot in the cloud storage systems or allow the user's system to mount to a snapshot in the cloud storage systems, the storage vault controller essentially operates in reverse to the storage operation, i.e., the storage vault controller retrieves data from the cloud storage system(s) in accordance with the storage scheme used (e.g., RAID level used), decrypts the data if it had been encrypted, decompresses the data, and validates the data via checksum in order to provide validated user data back to the user system.

In certain exemplary embodiments, while one or more snapshots are mounted, the storage vault controller suspends the taking of snapshots in order to avoid snapshotting corrupted data and also to avoid the loss of potentially valuable snapshots that may "age out" of the system.

It should be noted that a particular snapshot may contain the ransomware that caused a ransomware attack in the first place, but during a ransomware attack, the user generally would disable external communications through which the ransomware attack could be repeated, so in most cases the snapshot version still could be used in a safe manner and potentially could be used to perform forensic analysis of the attack.

Figure 8:
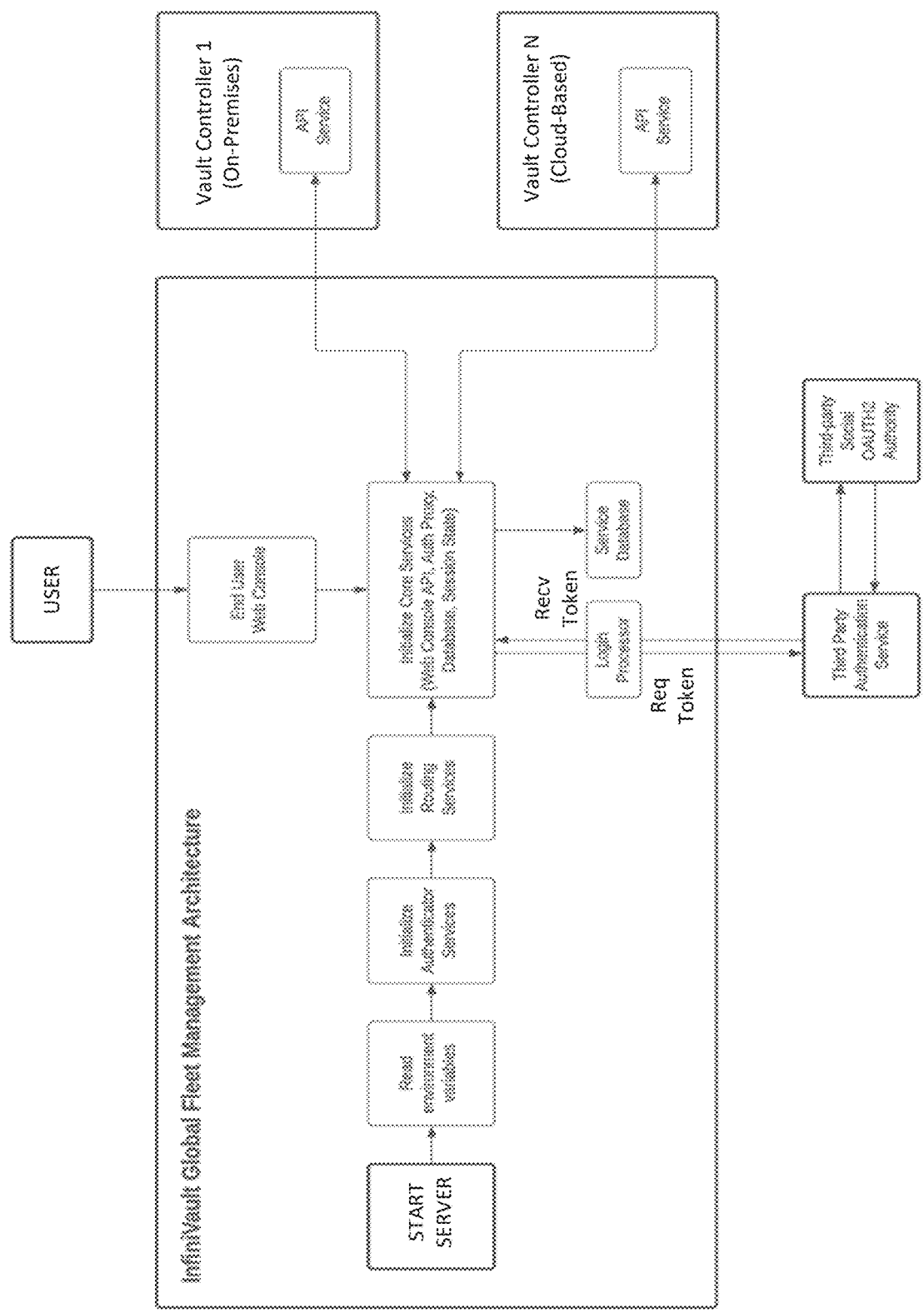
FIG. 8 is a schematic diagram showing a "STorage as a Service" (STaaS) management architecture, in accordance with one exemplary embodiment.

FIG. 8 is a schematic diagram showing a "STorage as a Service" (STaaS) management architecture, in accordance with one exemplary embodiment. Here, the system includes multiple (N) storage vault controllers, which may include on-premises storage vault controllers (e.g., at user/customer premises and/or at vault administrator sites) and/or cloud-based storage vault controllers. These storage vault controllers are access through various Application Program Interface (API) services. A separate system in communication with the storage vault controllers can provide common functions such as the web console, login services, third-party authentication services, routing services, etc.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the storage vault controllers) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. A system and storage vault controller that stores copies of user data redundantly in cloud-based storage and maintains secure immutable snapshots of the user data in a manner that prevents potential attackers from accessing the user data, the immutable snapshots, and the storage vault controller operating system.

P2. A method for automatically provisioning a data backup and recovery system by a storage vault controller, the method comprising: receiving specification of a number of end points to use for storing user data in one or more cloud-based storage systems; receiving a distinct name for each of the end points; receiving cloud storage credentials for a plurality of pre-configured cloud storage buckets; receiving specification of a type of redundancy to use for storing the user data across the end points; receiving a mapping of the end points to the pre-configured cloud storage buckets; mounting the end point names; automatically associating each end point with a corresponding pre-configured cloud storage bucket and cloud storage credentials in accordance with the mapping such that user data written to a mounted end point name is automatically written securely to the corresponding cloud storage bucket; and periodically generating immutable incremental snapshots of the data in the cloud storage buckets.

P3. A method of detecting or inferring a possible ransomware attack or other data breach comprising: generating a plurality of successive immutable incremental snapshots of data stored in a storage system; statistically analyzing the successive immutable incremental snapshots; and generating an alert based on an abnormal pattern of snapshot sizes.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method for automatically provisioning a data backup and recovery system by a storage vault controller, the method comprising:
   receiving specification of a number of end points to use for storing user data in one or more cloud-based storage systems;
   receiving a distinct name for each of the end points;
   receiving cloud storage credentials for a plurality of pre-configured cloud storage buckets;
   receiving a mapping of the end points to the pre-configured cloud storage buckets;
   mounting the end point names;
   automatically associating each end point with a corresponding pre-configured cloud storage bucket and cloud storage credentials in accordance with the mapping wherein user data written to a mounted end point name is automatically written securely to the corresponding cloud storage bucket; and
   generating a plurality of successive immutable incremental snapshots of the data in the cloud storage buckets, wherein the storage vault controller is configured to only accept user data from one or more trusted endpoints internal to a private user network, and wherein the storage vault controller is configured to communicate securely with the one or more cloud-based storage systems via a user private core routing firewall through an interface that will not accept any externally sourced connections other than authorized secure vault administrator connections.

2. The method of claim 1, further comprising:
   receiving specification of a type of redundancy to use for storing the user data across the end points; and
   storing the user data redundantly across the end points in accordance with the specified type of redundancy.

3. The method of claim 1, further comprising establishing an encrypted passphrase for use in establishing the cloud storage buckets.

4. The method of claim 1, configures further comprising configuring a data-at-rest encryption option for which the storage vault controller encrypts data before sending it to the cloud storage systems.

5. The method of claim 1, wherein the storage vault controller is deployed in a public network and wherein the storage vault controller is configured to receive user data from a user private network over a secure data flow.

6. The method of claim 5, wherein the storage vault controller is configured to communicate securely with the one or more cloud-based storage systems through an interface that will not accept any externally sourced connections other than authorized secure vault administrator connections.

7. The method of claim 1, further comprising:
   statistically analyzing the successive immutable incremental snapshots; and
   generating an alert based on an abnormal pattern of snapshot sizes suggestive of a possible ransomware attack.

8. A storage vault controller for automatically provisioning a data backup and recovery system, the storage vault controller comprising:
   at least one processor coupled to at least one memory containing instructions which, when executed by the at least one processor, causes the system to perform processes comprising:
   receiving specification of a number of end points to use for storing user data in one or more cloud-based storage systems;
   receiving a distinct name for each of the end points;
   receiving cloud storage credentials for a plurality of pre-configured cloud storage buckets;
   receiving a mapping of the end points to the pre-configured cloud storage buckets;
   mounting the end point names;
   automatically associating each end point with a corresponding pre-configured cloud storage bucket and cloud storage credentials in accordance with the mapping wherein user data written to a mounted end point name is automatically written securely to the corresponding cloud storage bucket; and
   generating a plurality of successive immutable incremental snapshots of the data in the cloud storage buckets, wherein the storage vault controller is deployed in a private user network and wherein the storage vault controller is configured to only accept user data from one or more trusted endpoints internal to the private user network, and wherein the storage vault controller is configured to communicate securely with the one or more cloud-based storage systems via a user private core routing firewall through an interface that will not accept any externally sourced connections other than authorized secure vault administrator connections.

9. The storage vault controller of claim 8, further comprising:
   receiving specification of a type of redundancy to use for storing the user data across the end points; and
   storing the user data redundantly across the end points in accordance with the specified type of redundancy.

10. The storage vault controller of claim 8, further comprising establishing an encrypted passphrase for use in establishing the cloud storage buckets.

11. The method of claim 8, further comprising configuring a data-at-rest encryption option for which the storage vault controller encrypts data before sending it to the cloud storage systems.

12. The storage vault controller of claim 8, wherein the storage vault controller is deployed in a public network and wherein the storage vault controller is configured to receive user data from a user private network over a secure data flow.

13. The storage vault controller of claim 12, wherein the storage vault controller is configured to communicate securely with the one or more cloud-based storage systems through an interface that will not accept any externally sourced connections other than authorized secure vault administrator connections.

14. The storage vault controller of claim 8, further comprising:
   statistically analyzing the successive immutable incremental snapshots; and
   generating an alert based on an abnormal pattern of snapshot sizes suggestive of a possible ransomware attack.

15. A computer program product comprising at least one tangible, non-transitory computer-readable storage medium having embodied therein computer program instructions which, when executed by one or more processors of a storage vault controller, cause the storage vault controller to perform computer processes comprising:
   receiving specification of a number of end points to use for storing user data in one or more cloud-based storage systems;
   receiving a distinct name for each of the end points;
   receiving cloud storage credentials for a plurality of pre-configured cloud storage buckets;
   receiving a mapping of the end points to the pre-configured cloud storage buckets;
   mounting the end point names;
   automatically associating each end point with a corresponding pre-configured cloud storage bucket and cloud storage credentials in accordance with the mapping wherein user data written to a mounted end point name is automatically written securely to the corresponding cloud storage bucket; and
   generating a plurality of successive immutable incremental snapshots of the data in the cloud storage buckets, wherein the storage vault controller is deployed in a private user network and wherein the storage vault controller is configured to only accept user data from one or more trusted endpoints internal to the private user network, and wherein the storage vault controller is configured to communicate securely with the one or more cloud-based storage systems via a user private core routing firewall through an interface that will not accept any externally sourced connections other than authorized secure vault administrator connections.

16. The computer program product of claim 15, further comprising:
   receiving specification of a type of redundancy to use for storing the user data across the end points; and
   storing the user data redundantly across the end points in accordance with the specified type of redundancy.

17. The computer program product of claim 15, further comprising establishing an encrypted passphrase for use in establishing the cloud storage buckets.

18. The method of claim 15, further comprising configuring a data-at-rest encryption option for which the storage vault controller encrypts data before sending it to the cloud storage systems.

19. The computer program product of claim 15, wherein the storage vault controller is deployed in a public network and wherein the storage vault controller is configured to receive user data from a user private network over a secure data flow.

20. The computer program product of claim 19, wherein the storage vault controller is configured to communicate securely with the one or more cloud-based storage systems through an interface that will not accept any externally sourced connections other than authorized secure vault administrator connections.

21. The computer program product of claim 15, further comprising:
   statistically analyzing the successive immutable incremental snapshots; and
   generating an alert based on an abnormal pattern of snapshot sizes suggestive of a possible ransomware attack.

\* \* \* \* \*

UNITED STATES PATENT AND TRADEMARK OFFICE
CERTIFICATE OF CORRECTION

| | |
|---|---|
| PATENT NO. | : 12,443,711 B1 |
| APPLICATION NO. | : 17/994949 |
| DATED | : October 14, 2025 |
| INVENTOR(S) | : Jeffrey Slapp |

Page 1 of 1

It is certified that error appears in the above-identified patent and that said Letters Patent is hereby corrected as shown below:

In the Claims

At Column 14, Claim number 4, Line number 16, please delete "configures" after "claim 1,"

Signed and Sealed this
Second Day of December, 2025

John A. Squires
*Director of the United States Patent and Trademark Office*